3,020,148
PRODUCTION OF REFRACTORY METALS
Wilmer A. Jenkins II and Howard W. Jacobson, Wilmington, Del., assignors to E. I. du Pont de Nemours and Company, Wilmington, Del., a corporation of Delaware
Filed Apr. 5, 1960, Ser. No. 20,218
8 Claims. (Cl. 75—26)

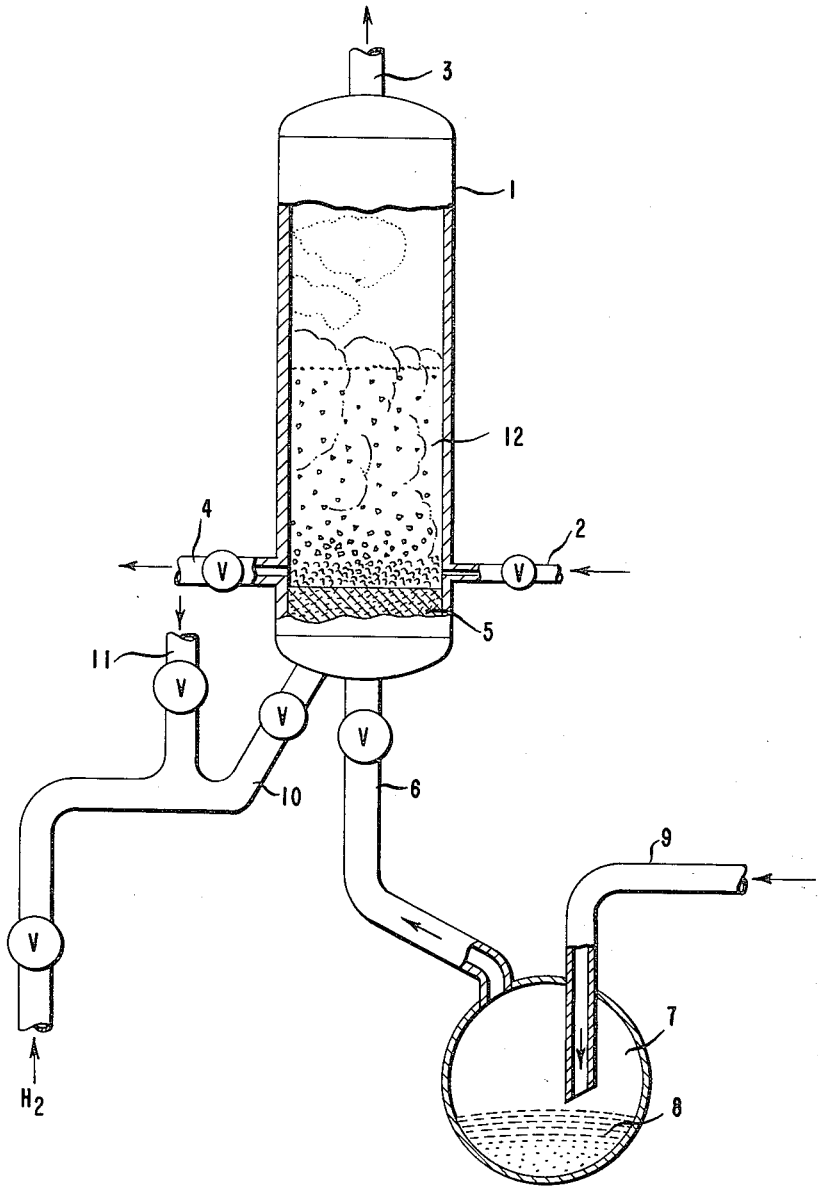

This invention relates to the production of elemental niobium, tantalum and tungsten in a highly pure form. More particularly, it relates to novel, commercially adaptable methods for the preparation of these refractory metals. More specifically, it provides a continuous type of process from which commercial yields of said metals in a highly purified state are readily obtained by reduction of their halides with hydrogen in a fluidized bed made up of particles of the elemental metal under production.

It is known that niobium metal can be prepared by reducing its halides with hydrogen. For example, U.S. Patent 2,604,395 reduces niobium pentachloride with hydrogen under static conditions to deposit an integrally bonded coating of the metal on a tantalum metal base. The employment of fluidized bed techniques in carrying out chemical processes is also known. However, until the present invention it has not been possible to adapt or carry out commercially the hydrogen reduction of the halides of the metals above mentioned except under static conditions of deposition, or to produce such metals continuously by deposition of a highly pure form of the metal on finely divided particles of the same metal.

It is among the objects of this invention to overcome the above and other disadvantages characterizing prior methods for obtaining niobium, tantalum and tungsten metals and to provide novel methods for attaining such objects. It is among the particular objects of this invention to provide an improved, novel process for obtaining elemental niobium, tantalum and tungsten metals in pure state and by means of novel procedures useful and adaptable for continuous, large-scale commercial operation; and to provide an improved vapor phase process for reducing the normal chlorides of said metals with hydrogen to recover high, increased yields of the metal product. Other objects and advantages of the invention will be apparent from the following description and accompanying, diagrammatic drawing which illustrates one form of apparatus in which the invention can be carried out.

In practically adapting the invention, pure elemental niobium, tantalum and tungsten are readily obtained and continuously produced by reducing a chloride of the metal with hydrogen. The reactants are charged at controlled rates to a closed reaction chamber maintained at temperatures ranging from about 700–950° C. and wherein an ebullient, fluidized bed suspension of pure, finely divided particles of the metal under production is maintained. In niobium preparation, the equivalent of from 50 to 225 moles of $H_2$ per mole of the niobium chloride is used, in a tantalum production from 100 to 225 moles of hydrogen per mole of the tantalum chloride is utilized, while in tungsten production the ratio should be from 3 to 50 moles of hydrogen per mole of the tungsten chloride.

In a specific and preferred embodiment, pure, elemental niobium is continuously produced by reacting hydrogen and niobium pentachloride in a closed reaction zone at temperatures ranging from 750° C. to 850° C., employing the equivalent of from 80 to 180 moles of hydrogen per mole of niobium pentachloride, maintaining the reactants in contact with an ebullient, fluidized bed suspension of pure, finely divided particles of niobium, and recovering from the reactor the pure, granular form of niobium metal which results in the process.

Referring to the drawing, there is shown a vertically disposed, cylindrical or tubular type reactor 1 which can be composed of pure silica, niobium, silica glass, niobium-coated metal, or other material which under the prevailing reduction conditions will be non-reactive toward the reactants, products and reaction by-products. The reactor is provided with an inlet conduit 2 and outlet conduits 3 and 4 and conventional type electrical or other desired furnacing means (not shown) can be externally associated with the reactor to heat and maintain it and its contents at temperatures ranging from about 700° C. to 950° C. Suitably disposed in the bottom or lower portion of the reactor 1 and functioning to support or retain fluidizable bed particles when in repose therein is a perforated grid or porous filter 5 which is also composed of a material which is inert to the action of the gases fed into the reactor. Also provided in the bottom of the reactor is a valve-controlled inlet conduit 6 which is in open communication with a generator or vaporizer 7 and through which a vaporized metal halide under reduction can be charged at a controlled rate into the reactor. The vaporizer can be enclosed within or otherwise suitably associated with an electrical or other form of desired heating means (not shown) to maintain it at any desired temperature and effect vaporization of a volatile metal halide 8 previously charged thereto via a conduit 9 from a source of supply (not shown). The conduit 9 can also be used to introduce an inert carrier gas (argon, helium, etc.) along with the vaporized halide. A separate, valve-controlled inlet conduit 10 is also provided in the reactor bottom through which hydrogen from a source of supply (not shown) is charged to the reactor. An associated, valve-controlled auxiliary conduit 11 communicates with the conduit 10 through which an inert gas diluent (argon, helium, etc.) can be mixed with the hydrogen reducing gas feed and when assistance and promotion of the fluidization of bed particles in the reactor is desired.

In employing an apparatus of the type described for niobium production a sufficient quantity of high purity, comminuted niobium sized to, say, —30 to +200 mesh, is charged initially into the reactor through the inlet 2, where it becomes supported on the apertured retaining plate 5. A continuous flow of pure hydrogen, or preferably, a mixture of hydrogen and a diluent inert gas such as argon is then charged into the system from the conduit 10 and upwardly through the perforated plate member 5 for flow into the reactor. This flow is effected at a controlled lineal velocity of, preferably, from about 0.4 feet per second to about 3.0 feet per second, in consequence of which an expanded, bubbling bed suspension 12 is formed in which the fluidized niobium particles are maintained in constant agitation and ebullient motion in the reactor to expose their entire surfaces for contact throughout the subsequent reduction reaction. The reactor 1 and bed 12 are then brought to a preferred temperature of from about 750° C. to about 850° C. by applying external heat to the reactor through its associated furnacing means. Alternatively, this heating can be effected, if desired, by preheating the hydrogen gas or the hydrogen and inert feed gas mixture charged from conduit 10 to temperatures ranging from about 700° C. to about 1100° C. and charging the heated gas into the reactor prior to introducing the niobium halide reactant therein. When the desired bed and reaction temperature is reached, such hydrogen or hydrogen and inert gas flow is continued in order to maintain the bed in fluidized condition and a feed of vaporized niobium pentachloride reactant preheated to a temperature of about 300° C. is then charged into the reactor from the conduit 6 and vaporizer 7, such introduction being effected either by its own vapor pressure or by a flow of an inert carrier gas. The mole ratio of hydrogen to niobium pentachloride fed to the reactor is maintained at a rather high value to insure optimum results being obtained and an absolute pressure, measured at the reactor outlet, preferably, of from 1 to 2 atmospheres is maintained in the reactor. Preferably, said ratio is, depending on the temperature, between 80 and 180 to yield a niobium metal product of upwards of 90% of the niobium values being fed to the reactor, in accordance with the following equation:

$$2NbCl_5 + 5H_2 \rightarrow 10HCl + 2Nb$$

In determining the lower limit which should be set for the hydrogen-to-metal halide ratio, two factors must be considered. In producing niobium in accordance with the invention, operating at temperatures and ratios lower than those specified will result in greatly decreased yields of metal deposited from the halide, and may also result in undesired formation of "black bed" in the reactor. This arises as a result of incomplete reduction of the metal halide and deposition of niobium values on the metal bed particles in the form of lower chlorides. To avoid this, we prefer to operate at temperatures ranging from 750–800° C. when hydrogen ratios above 90 are used, and at temperatures ranging from 800–850° C. when hydrogen ratios from 50 to 90 are employed. In general, at a given temperature within the range specified, it will be found that yield increases with ratio; and at a given ratio within the range specified, yield increases with temperature.

As the reduction reaction proceeds, the niobium metal formed deposits upon the suspended niobium particles in the bed, causing them to grow and increase in size by accretion. When they increase to a size of about —20 to +80 mesh, the bed no longer fluidizes effectively under the conditions mentioned. Continuous withdrawal from the reactor through the outlet 4 of the non-fluidized niobium metal product from the reactor is then undertaken. The pure metal product recovered can be fabricated for use in various applications, including those requiring the property of resistance to chemical corrosion and due to its high melting point can be alloyed with other metals to obtain high-temperature, oxidation-resistant products. Unreacted hydrogen, niobium pentachloride and reaction by-products, and partially reduced lower chlorides are withdrawn from the system through reactor outlet 3 for passage to conventional condensers, separators or suitable recovery equipment (not shown). If desired, these may be recycled back to the closed reaction vessel along with additional niobium pentachloride and hydrogen for further reaction. Thus, unreacted niobium values can be withdrawn from the reactor predominantly in the form of $NbCl_4$. This by-product can condensed to a light brown powder and returned to the $NbCl_5$ vaporizer with additional chlorine to reconvert it to $NbCl_5$ if desired for ultimate reprocessing in the metal-producing reactor.

In removing enlarged nobium particles through the withdrawal outlet 4, some smaller particles will also be withdrawn therewith. These can be recovered and re-employed in the system by classifying in conventional equipment and if desired, combined with additional appropriately sized niobium particles to be fed back to replenish the bed for continued metal deposition. Thus, a continuous operation can be effected by intermittently or continuously withdrawing the lower portion of the bed which is predominantly —20 to +80 mesh particle size, and recharging with the —30 to +200 mesh portion.

If the material from the bed is cooled from the operating temperature of the reactor to room temperature in an atmosphere of an inert gas, the metal will absorb or combine with very little hydrogen. On the other hand, if the niobium metal particles are cooled to below 300° C. under a positive pressure of hydrogen, a niobium product containing 1.10% hydrogen by weight can be obtained; that is to say, the compound NbH forms in this cooling. This has been confirmed by X-ray analysis of the product. This niobium hydride product is friable and may easily be broken up to a powder, resized by screening, and the —30 to +200 mesh fraction returned to the reactor for further processing and dissociation into Nb and $H_2$ under the 700–950° C. temperatures prevailing in the reactor. Thus a means is provided for obtaining bed material of the proper screen size to maintain operation of the fluidized system.

To a clearer understanding of the invention, the following specific examples are given. These are illustrative only and are not to be construed as in limitation of the invention.

*Example I*

75 grams of niobium powder having a —80 mesh particle size, with approximately 25% thereof being —120 mesh, was charged to a silica reactor tube having a 22 mm. internal diameter and provided with a porous filter adapted to retain the niobium charge within the tube. The latter was disposed in furnacing means adapted to externally heat the tube to any desired temperature. The charge of niobium was fluidized to double its static bed volume by means of the upward flow through the tube of a mixture of 1.8 liters/min. of hydrogen and 30 ml./min. of argon. These feed gases were preheated to 900° C. before being introduced into the reactor and the reactor was maintained at 850° C. and at a pressure of 1.1 atmospheres absolute. Through a separate inlet 35.5 grams of a charge of niobium pentachloride was introduced into the reactor. This reactant was introduced into the reactor at 300° C. by a flow of argon at a rate of 8 ml./min. The mole ratio of hydrogen to niobium pentachloride employed in the reaction was 135.

The reaction was allowed to proceed until, after 3⅔ hours, all niobium pentachloride in the separate reservoir had been volatilized and carried into the reaction tube. The bed was then cooled by means of flowing argon therethrough and the bed weight was found to be 85.15 grams representing an increase of 10.15 grams over the original weight of the bed. This represented an 84% yield on the niobium volatilized from the niobium pentachloride charge and was in contrast to a less than 10% yield when recourse was had to prior art procedures wherein static conditions prevailed and stoichiometric quantities of reactants were used.

A sieve analysis of the product showed that whereas 18.75 grams of the starting material would pass 120 mesh screen, only 13.85 grams would pass such screen after the reaction. The niobium product obtained was found to be of high purity.

*Example II*

In a 22 mm. silica tube, disposed within an appropriate furnace installation, 75 grams of niobium powder was fluidized by the upward flow of a mixture of 1.4 liters per minute of hydrogen and 40 ml. per minute of argon, these volumes being measured at room temperature. This mixture of gases was preheated to 1000° C. before introduction into the reaction chamber. The bed temperature was maintained, during the reaction, at 850° C. by externally heating the reactor. The mole ratio of hydrogen to niobium pentachloride was 172. The reactor pressure was maintained at 1.1 atmospheres absolute.

In a separate, externally heated reservoir, 25.08 grams of niobium pentachloride was volatilized at 250° C. and charged into the reactor by means of a flow of 10 ml. per minute of argon, these gases being introduced into the reactor through an inlet separate from that through which the hydrogen is introduced. After 4⅔ hours of operation, all of the niobium pentachloride had been volatilized and the bed was cooled by means of a flow of argon. The weight of the final bed was 82.56 grams, representing a weight increase of 7.56 grams and the deposition of 88% of the total niobium from the pentachloride.

Following the run, a sieve analysis of the bed showed 4.95 grams of the material passed through 200 mesh screen, whereas 11.6 grams of the starting bed was finer than 200 mesh.

*Example III*

75 g. of −120 mesh tantalum metal of which 18% was −200 mesh, was fluidized in a 22 mm. silica tube containing a silica wool retaining pad, by flowing 1.2 liters per minute of hydrogen plus 35 ml. per minute of argon upwardly through the pad and tube. The temperature of the bed was then raised to 900° C. and a reactor pressure of 1.2 atmospheres absolute was maintained. In a separate, externally heated reservoir, 32.15 g. of $TaCl_5$ was heated to 300° C. and passed into the reactor bed through a separate inlet by means of a flow of 15 ml. per minute of argon. A hydrogen to tantalum pentachloride ratio of 156 was maintained throughout this experiment.

The reaction was allowed to proceed for 4½ hours until all of the $TaCl_5$ was volatilized. A sieve analysis of the bed material was as follows:

Before reaction: 13.55 g. passed 200 mesh screen
After reaction: 6.50 g. passed 200 mesh screen The yield of tantalum calculated on material volatilized to the reactor was 70%.

*Example IV*

90 grams of tungsten metal of −100+200 mesh particle size, 30% of which was −140 mesh, was fluidized in a 22 mm. silica tube by the upward flow of 2.0 liters per minute of hydrogen plus 40 ml. per minute of argon. The temperature of the tungsten bed was raised to 750° C. and a pressure of 1.0 atmospheres was maintained in the reactor. In a separate externally heated reservoir, 121 g. of $WCl_6$ was volatilized at 347° C. and passed into the reactor by means of argon as a carrier gas flowing at a rate of 10 ml./min. After a reaction time of 2 hours, all of the $WCl_6$ had been volatilized from the reservoir, and after cooling the reactor, 52 grams of tungsten metal was found to be deposited on the original bed material. A sieve analysis of the bed material was as follows:

Before reaction: 27.0 grams passed 140 mesh screen
After reaction: 17.2 grams passed 140 mesh screen The yield, calculated on the basis of the $WCl_6$ volatilized to the reactor, was determined to be 93%. The mole ratio of hydrogen to $WCl_6$ used in this example was 35.

*Example V*

Using the apparatus described in the Example I, a charge of 75 g. of niobium of −60 +120 mesh screen size was fluidized by the flow of 2.6 liters per minute of hydrogen and 50 ml. per minute of argon. These gases were preheated to 900° C. before being introduced into the reactor which was maintained at a pressure of 1.0 atmosphere. The fluidized bed temperature was maintained at 850° C. by means of auxiliary furnacing means and a flow of niobium pentachloride to the reactor was begun from an outside reservoir. The mole ratio of $H_2$ to $NbCl_5$ employed in the reaction was above 100 and the $NbCl_5$ was carried into the reactor by a flow of 8 ml. per minute of argon.

The reaction was allowed to proceed over a period of 7.3 hours, during which time 135 grams of niobium pentachloride were volatilized into the reactor. At the conclusion of this time, the flow of $NbCl_5$, along with its carrier gas, was shut off, and while the flow of hydrogen was continued, the reactor was cooled over a 1½ hour period from 850° C. to room temperature. The bed was discharged from the reactor and its particle size was noted to have increased significantly during the run. X-ray analysis of the material showed it to be almost completely niobium hydride, NbH. The product was very friable and was lightly crushed using a stainless steel mortar and pestle. From this crushing approximately 80 grams of hydride of particle size −80 to +200 mesh, 20 grams of −60 +80 mesh, and 10 grams of −200 mesh material were obtained.

Of the 80 gram portion thus obtained, 75.83 grams were returned to the reactor as starting bed material which on dissociation would produce 75 grams of niobium metal, for the operation of our invention as given in Example I. It has been shown that at 800° C., the hydride is decomposed to niobium metal and hydrogen.

*Example VI*

To a conical-bottomed tubular reactor, 18″ in diameter and 9′ in height, provided with inlet and outlet conduits affording a continuous type of operation, hydrogen preheated to 1000° C. was passed upwardly continuously through a plurality of openings near the conical bottom of the reactor and through a bed of finely divided niobium particles which had been previously charged to the reactor and retained within the reactor on a porous silica wool support. The niobium had a particle size of −80 to +200 mesh and in static condition occupied about ⅓ of the volume of the reactor. Hydrogen introduction was effected at a rate to provide an upward flow of 1.2 ft. per sec. immediately above the bed and to maintain the niobium particles in fluidized state, such rate being equivalent to 120 moles of hydrogen per mole of the niobium pentachloride reactant to be fed to the reaction zone. A bed temperature of 800° C. and a reactor pressure of 1.5 atmospheres was maintained during this run. The niobium pentachloride reactant was vaporized in an externally heated, separate reservoir at a constant rate of 0.35 mole/min. and carried into the reactor by passing argon over the surface of the refluxing niobium pentachloride. About 125 lbs. of niobium particles in the size range mentioned were maintained in the bed by intermittently withdrawing a portion of the enlarged particles formed in the resulting reaction and by reason of the deposition of the niobium reaction product on the suspended particles. The withdrawn particles were sized and the fines portion was returned to the bed. The larger sized particles (−20 +80 mesh) were recovered as a product of the operation and at a rate of 3.8 lbs. per hour, representing about a 90% yield based on the niobium pentachloride charged to the system. The fluidized bed was maintained at a temperature of about 800° C. by supplying additional heat externally through the walls of the reactor. Unreacted hydrogen and by-products of reaction were withdrawn from the reactor and passed through a cooler and scrubber from which residual hydrogen and the separately recovered reaction by-products were repurified and recycled for reuse in the system. The recovered niobium metal was of extremely high purity and was highly suitable as an alloying metal to obtain high-temperature, oxidation-resistant alloys.

*Example VII*

150 grams of niobium powder of −80 mesh particle size was fluidized in a closed 22 mm. silica reaction tube, disposed within an appropriate furnace installation by the upward flow of a mixture of 0.7 liter/min. of hydrogen and 10 ml./min. of argon, these volumes being measured at room temperature. An 850° C. bed temperature was maintained during the reaction by externally heating the reactor. The mole ratio of hydrogen to niobium pentachloride was 50 and a pressure of 1.1 atmospheres absolute, measured at the reactor outlet, was maintained in the reaction vessel.

In a separate, externally heated reservoir, 55.0 grams of niobium pentachloride was volatilized at 250° C. and charged into the reactor by means of a flow of 12 ml./min. of argon, these gases being introduced into the reactor through an inlet separate from that through which the hydrogen is introduced. After six hours of operation, all of the niobium pentachloride had volatilized and the bed was cooled by means of a flow of argon. The weight of the final bed was 164.2 grams, representing a weight increase of 14.2 grams and the deposition of 75% of the total niobium from the pentachloride.

By-product niobium lower chlorides and unreacted $NbCl_5$ were separated from other gaseous reaction by-products and recovered in appropriate condensation equipment associated with the reactor. In such equipment, a total of 11.0 grams of niobium tetrachloride was recovered, representing a 91.5% recovery of by-product $NbCl_4$. The amount of unreacted $NbCl_5$ was negligle. Ten grams of this by-product $NbCl_4$ was sublimed into the vaporizer in a stream of chlorine at 500° C., which served to convert it to $NbCl_5$. An additional 44 grams of $NbCl_5$ was then added to the vaporizer and the reduction procedure described above was repeated to obtain essentially the same results.

While described in its application to certain specific embodiments, the invention is not restricted thereto. Hence, due variance therefrom can be undertaken without departing from its underlying principles and scope. In general, use is contemplated of any normal chloride, e.g., penta- or hexa-, of the metals mentioned, specific examples of which include $NbCl_5$, $TaCl_5$ and $WCl_6$. The hydrogen employed as the gaseous reducing and fluidizing agent can be used, if desired, in admixture with an inert carrier gas, such as argon, where assistance in fluidization of the particles being suspended is necessary The mole ratio of hydrogen used, both as a reducing reactant and a fluidizing reagent is variable but in the instance of niobium preparation the ratio can range to as low as 50/1 and preferably ranges from 80/1 to 225/1; in the instance of tantalum preparation, the ratio should range from 100/1 to 225/1, and in tungsten production, it should be between 3/1 to 50/1. If desired, larger amounts of $H_2$ can be employed. The upper limit of this reactant is dependent upon economic considerations while its lower limit, in the case of niobium, as already noted, is dependent upon the yield desired. Certain limitations of operational procedure also must be observed. Thus, care must be taken not to mix the metal chloride and hydrogen reactants at a temperature above about 450° C. prior to their introduction into the reactor, else undesired reduction of the chloride to lower chlorides and partially to the elemental metal will take place and at a rate sufficient to induce objectionable plugging and stoppage of the reactor inlet lines or distributor plates. Additionally, a definite positive pressure must be maintained on the chloride feed line in order to prevent hydrogen backflow and consequent feed line plugging. It has also been found desirable to operate the reaction chamber at slightly above atmospheric pressure to avoid undesired air in leakage.

As already indicated, careful control of the temperature at which the reaction is carried out is necessary in achieving optimum yields from the metal values charged to the reactor. Thus, the optimum temperature ranges for effecting metal deposition under this invention will, as previously noted, depend upon the mole ratio of $H_2$ to metal halide, but in general, can comprise from 750 to 850° C. for niobium production; from 800 to 875° C. for tantalum production and from 700 to 800° C. for tungsten manufacture. At temperatures from 450 to about 650° C., niobium pentachloride reduces only to lower chlorides unless an extremely high and consequently uneconomical ratio of $H_2$ to metal chloride is used. Should temperatures in excess of 950° C. be used, this will be found to prove undesirable especially in large scale operations wherein it is extremely difficult to supply sufficient heat at these temperatures to a large reactor operating at high production rates.

When a relatively constant ratio of hydrogen to the metal chloride is maintained and conditions of temperature, bed depth, etc., are also held constant, it will be found that the deposition rate of metal is proportional to the gas-feed velocity. As the reaction proceeds, the niobium or other metal under production is deposited upon the suspended metal particles in the fluidized bed causing them, as already noted, to grow by accretion. When the particles increase to a size of about −20 to +80 mesh the bed can no longer be effectively fluidized under the conditions mentioned and the "grown" particles are then withdrawn from the bed as formed through the reactor outlet for recovery and use. The success of any given operation under the invention will be based upon proper limitation of the following factors, among others: (1) particle size distribution, (2) ratio of hydrogen to $NbCl_5$ (or other contemplated metal chloride) and of these to the carrier gas to insure that proper fluidization of the bed is attained, and (3) temperature of operation. In fluidizing the bed and growing the particles thereof sized from −30 to +200 mesh to the desired size of about −20 to +80 mesh, e.g., a reactor height of about 2½ times that of the bed at repose is generally adequate to prevent excessive blowover through the exit lines of the reactor. As an additional precaution against blowover from the bed, the upper portion of the reactor can be of larger diameter than the section which encloses the bed itself so that the gas velocity will be reduced in this section of the reactor. As regards the ratio of hydrogen to chloride to be employed, pure hydrogen may in itself not be sufficient to attain optimum fluidization for carrying −30 to 200 mesh metal powder at a temperature of 800-850° C. In such instances, recourse can be had to the use of carrier gases in conjunction with the hydrogen. Thus, in the instance of niobium preparation, the presence of about 3.1% argon and 0.9% HCl by volume in the reactor will be found to insure good fluidization under the temperatures mentioned.

As is well known, the properties of refractory metals such as those contemplated for production herein are particularly susceptible to the presence of small or trace amounts of impurities. Even fractional percentages of such interstitial impurities as oxygen or nitrogen will seriously depreciate the desirable properties of the metal product. The absorption of impurities by such metals is generally in direct proportion to the surface area of the metal particles. A particular advantage afforded by this invention is that it will yield finely divided metal grains or particles of low surface area. The purity thereof will be obviously dependent upon the purity of the reactants used and it is therefore important that the metal chloride, hydrogen and carrier gases employed in the process should exhibit maximum purity characteristics and be free particularly from oxygen and nitrogen.

The depth of the bed in the reactor is variable and satisfactory operation can be obtained on a small scale when, for example, a 2″ to 4″ bed (static measurement) is used with expansion of the bed to, say, about 5″ to 8″ depth when fluidization is effected through use of a lineal velocity of hydrogen of from about 0.7 to 1.2 foot per second. In larger scale operations, a much deeper bed and higher gas velocities are used. The diameter and length of the reactor is also subject to variance and will depend upon the production rate undertaken and the gas velocities resorted to. The support or perforated plate element 5 in the lower portion of the reactor and below the reaction zone can serve to distribute the gaseous reactants and fluidizing media charged into that zone. It can as already noted comprise a pad or layer of silica wool or similar non-reactive, porous material held in place and suitably secured to the reactor interior by means of an associated supporting element. In large scale operations, recourse to a porous plate or other suitable type of distributing element can be had.

The metal particles employed as bed material and upon which the metal formed in the process deposits during the reduction can be prepared by crushing and sizing a highly purified form of the metal to the desired fluidizable size.

When the particles grow to a size sufficiently large to require their removal from the reactor they can be conventionally withdrawn through a suitably valved outlet positioned at or near the bottom point of the fluidized bed and by suction, gravity flow or otherwise.

While reactor pressures ranging from about 1 to 2 atmospheres absolute, measured at the reactor outlet, have been indicated as being preferred for use, pressures substantially above atmospheric in order to increase production of metal in a reactor of a given size are also useful. In general, it has been found that within the temperature and H₂ to halide ratio ranges given, the pressure at the reactor outlet may vary between 0.5 to 5 and up to 10 atmospheres. The lower limit of pressure will be determined by productivity, i.e., rate at which desired product can be produced in a given-sized reactor while the upper limit will be determined by the strength of the materials of construction used in equipment employed in the process.

In some instances, it may be found desirable to produce mixtures of metals simultaneously in the process. If such simultaneous coreduction is practiced, the fluidized bed may be composed of particles of a mixture of the metals, and a mixture of the chlorides to be reduced may be fed to the reactor. In such coreduction, the hydrogen to metal chloride ratio used must be such that acceptable yields of each of the two or more metals being produced will be obtained.

This application is a continuation-in-part of our copending application Serial No. 781,650, filed December 19, 1958, now abandoned, which application, in turn, is a continuation-in-part of our parent application Serial No. 622,384, filed November 15, 1956, which is now abandoned.

We claim:

1. A method for producing in elemental state a metal selected from the group consisting of niobium, tantalum and tungsten comprising reacting a chloride of said metal with hydrogen in a closed reaction chamber and at temperatures ranging from 700–950° C., during the reaction maintaining in said chamber a fluidized suspension of finely divided solid particles of the metal under production upon the surfaces of which the metal being formed in the reaction will deposit, employing in said reaction a mole ratio of hydrogen to metal chloride of between 50/1 and 225/1 when niobium is being produced, of between 100/1 and 225/1 when tantalum is being produced, and of between 3/1 and 50/1 when tungsten is being produced, and recovering the resulting metal product.

2. A method for producing in elemental state a high purity metal selected from the group consisting of niobium, tantalum and tungsten comprising reacting in the vapor phase a normal chloride of said metal with hydrogen in a closed reaction chamber and at temperatures ranging from 700–950° C., during the reaction maintaining in said chamber a fluidized bed suspension of solid, granular particles of the pure metal under production onto the surfaces of which particles metal formed in the reaction deposits, employing a mole ratio of hydrogen to metal chloride of from 50/1 to 225/1 when niobium is being produced, from 100/1 to 225/1 when tantalum is being produced, and a mole ratio of 3/1 to 50/1 when tungsten is being produced, and continuously withdrawing from said chamber for recovery, granular metal particles which as a result of said reaction have increased to a size where they no longer fluidize under the prevailing reaction conditions.

3. A process for producing pure elemental niobium which comprises reacting in the vapor phase within a closed reaction chamber and at temperatures ranging from about 750 to 850° C., hydrogen and niobium pentachloride, during the reaction maintaining in said chamber a fluidized suspension of pure, finely divided solid niobium metal particles onto the surfaces of which niobium formed in the reaction deposits, employing in the reaction a mole ratio of hydrogen to niobium pentachloride between 50/1 and 225/1 and withdrawing from said chamber for recovery niobium particles which no longer fluidize under the prevailing reaction conditions.

4. A process for producing pure elemental tantalum which comprises reacting in the vapor phase within a closed reaction chamber and at temperatures ranging from about 800 to 875° C., hydrogen and tantalum pentachloride, during the reaction maintaining in said chamber a fluidized suspension of pure, finely divided solid tantalum metal particles onto the surfaces of which tantalum formed in the reaction deposits, employing in the reaction a mole ratio of hydrogen to tantalum pentachloride between 150/1 and 225/1, and withdrawing from said chamber for recovery tantalum particles which no longer fluidize under the prevailing reaction conditions.

5. A process for producing pure elemental tungsten which comprises reacting in the vapor phase within a closed reaction chamber and at temperatures ranging from about 700 to 800° C., hydrogen and tungsten hexachloride, during the reaction maintaining in said chamber a fluidized suspension of pure, finely divided solid tungsten metal particles onto the surfaces of which tungsten formed in the reaction deposits, employing in the reaction a mole ratio of hydrogen to tungsten hexachloride between 3/1 and 50/1, and withdrawing from said chamber for recovery tungsten particles which no longer fluidize under the prevailing reaction conditions.

6. A method for continuously producing a high purity metal in elemental state selected from the group consisting of niobium, tantalum and tungsten comprising charging a normal chloride of said metal and hydrogen in admixture with an inert carrier gas, upwardly into a reaction zone of a closed reactor and through a body of metal particles of the metal being produced maintained in said chamber, employing a charging rate sufficient to fluidize said body of particulate metal particles into a bubbling bed suspension in said chamber, the mole ratio of hydrogen to metal chloride being between 50/1 and 225/1 when niobium is being produced, between 100/1 and 225/1 when tantalum is being produced, and a mole ratio of hydrogen to metal chloride of from 3/1 to 50/1 when tungsten is being produced, maintaining said reaction zone at a temperature of from 700 to 950° C., during the reaction withdrawing from the reactor for recovery particulate metal particles which due to the reaction increase to such a size that they no longer fluidize under the prevailing reaction conditions, and replacing said withdrawn portions with fresh particles of the same metal which are essentially of the same size and size distribution as those present in said fluidized body.

7. A process for producing pure elemental niobium which comprises reacting hydrogen and niobium pentachloride in the vapor phase within a closed reaction chamber and at a temperature ranging from about 750 to 850° C., during the reaction maintaining in said chamber a fluidized suspension of pure, finely divided solid niobium metal particles onto the surfaces of which niobium formed in the reaction deposits, employing in the reaction a mole ratio of hydrogen to niobium pentachloride between 50/1 and 180/1, and withdrawing from said chamber for recovery niobium particles which no longer fluidize under the prevailing reaction conditions.

8. A process for producing pure elemental niobium which comprises reacting in the vapor phase within a closed reaction chamber and at temperatures ranging from about 750 to 850° C., hydrogen and niobium pentachloride, during the reaction maintaining in said chamber a fluidized suspension of pure, finely divided solid niobium metal particles onto the surfaces of which niobium formed in the reaction deposits, employing in the reaction a mole ratio of hydrogen to niobium pentachloride between 50/1 and 225/1, withdrawing from said chamber partially reduced niobium lower chloride byproducts formed in the reaction and recycling said byproducts to said chamber along with additional hydrogen and niobium pentachloride reactants, and separately withdrawing from said chamber for recovery niobium particles which no longer fluidize under the prevailing reaction conditions.

References Cited in the file of this patent

UNITED STATES PATENTS

| | | |
|---|---|---|
| 553,296 | Aylsworth | Jan. 21, 1896 |
| 2,604,395 | Gonser et al. | July 22, 1952 |
| 2,758,021 | Drapeau et al. | Aug. 7, 1956 |
| 2,766,112 | Shafer | Oct. 9, 1956 |
| 2,837,420 | Doerner | June 3, 1958 |

OTHER REFERENCES

Campbell et al.: The Iron Age, Apr. 10, 1952, pp. 113–117.